INVENTORS:
Wittich Meyerhuber, Heinrich Niestroj and Rolf Canzler

BY
Burgen, Dinklage & Sprung
Attorneys

3,546,899
Patented Dec. 15, 1970

3,546,899
METHOD AND APPARATUS FOR CONTROLLING THE LENGTH OF GOODS ON KNITTING MACHINE
Wittich Meyerhuber, Heinrich Niestroj, and Rolf Canzler, Ingolstadt, Germany, assignors to Schubert & Salzer Maschinenfabrik Aktiengesellschaft, Ingolstadt, Germany
Filed Apr. 19, 1968, Ser. No. 722,648
Claims priority, application Germany, Apr. 19, 1967, Sch 40,573
Int. Cl. D04b 15/88
U.S. Cl. 66—149                    21 Claims

ABSTRACT OF THE DISCLOSURE

Method and apparatus for controlling the knitting of goods by employing a constant draw-off force, measuring the draw-off distance and correcting to a standard distance by varying loop size of the knit.

---

The invention relates to a method for the production of equal goods lengths on hosiery or knitting machines, as well as an apparatus for the practice of the method.

In the manufacture of pieces of goods, especially those of sized length, such as stockings, sweaters, sleeves, and the like, difficulty is encountered in producing them in a precisely matching prescribed length, especially when identical pieces are being produced at different working stations in, for example, flat-bed knitting machines. These differences in length are to be attributed in part to differences in thread feed, and in part to differences in the adjustment of the loop-forming parts, or also to different draw-off tensions and to the influence of the yarns.

Various proposals have already been published for eliminating these individual factors for the purpose of producing identical goods lengths. According to French Pat. 1,352,859, for example, the thread feed is to be stabilized by performing an automatic adjustment of the cams according to the thread tension in a circular knitting machine. This method, however, and the apparatus for its practice have the disadvantage that they act only indirectly on the goods length and are very expensive when it is necessary to work alternately with a plurality of threads, as occurs, for example, on automatic hosiery machines, and also they are not usable when the thread consumption is subject to great and rapid variations as a result of the pattern. Neither is this known apparatus suitable for flat-bed knitting or hosiery machines having an interrupted thread supply.

In the case of flat-bed knitting machines attempts have already been made to produce identical goods lengths at all knitting heads by keeping the draw-off tension equal at all knitting heads and adapting it to the width of the goods (German Pat. 1,024,665, Swiss Pat. 327,238, German Pat. 1,076,311, and British Pat. 859,442). Fine adjustment means have also been provided for the uniform adjustment of the parts that determine the loop lengths by hand, these means permitting the individual fonts to be adjusted to one another (German Pat. 1,109,-308). By these means, however, none of the factors originating in the thread guidance can be excluded or compensated during the production of the pieces so that different lengths nevertheless occur with the same number of rows.

In the case of circular hosiery knitting machines, attempts have been made to control the length of the goods, which depends substantially on the portion between the welt and the heel called the "boot" or "leg" by means of photoelectric control systems during the knitting process. At least one photoelectric cell is located on the transparent draw-off tube and responds automatically when the prescribed goods length is reached so that the working of the heel can begin (German Pat. 32,238 and French Pat. 1,336,153). It has developed in practice, however, that the photoelectric measuring units cannot operate perfectly because the stockings are measured in a more or less twisted state so that the actual differences in length cannot be detected at all by the measuring device. The measurement of the length by optical methods in pneumatic draw-off devices has failed for this reason. In the case of formed pieces, such as fashioned pullover sweater pieces, or in the case of multi-font machines in which the shutting down of individual knitting head is not possible, this apparatus cannot be used either, because otherwise there is no longer any assurance of the proportionality of the lengths.

Therefore, there is nothing else to do in practice but to measure the individual pieces after they are made, sort them as to size, if desired, and readjust the apparatus as required. This time-consuming and difficult method of procedure furthermore achieves only limited success because during manufacture the factors prevailing at the individual work stations can vary in different ways so that the adjustment that has been made becomes incorrect, and this cannot be determined until after the pieces have been produced in each case.

The invention is thus directed to the problem of devising a method and a corresponding apparatus for the practice of the method for producing pieces of precisely equal length on knitting or hosiery machines, while preserving proportionality as regards shape and mesh size.

According to the present invention, this is achieved by the fact that the distance which each piece of goods is drawn off independently of the other, but with the same draw-off force, is measured during the production of same and compared in each case with a prescribed draw-off distance, and the loop size that is to be formed by the machine is adjusted to the piece in question on the basis of the difference that is found. The standard that represents the prescribed draw-off distance will be either the measured draw-off distance at a master knitting head or master machine, or the average of all measured draw-off distances, or even a draw-off distance recorded on a controlling tape. The measured draw-off distances and the prescribed draw-off distance are advantageously converted to electrical magnitudes and compared as such with one another in a known manner, the electrical differential magnitude that results in each case causing a variation of the loop size until this difference is eliminated, although comparison of the draw-off distances is also possible by mechanical methods if the measured draw-off distances and the prescribed draw-off distance are compared with one another as angles of rotation, a resulting difference of angles of rotation producing the variation in the loop size until this difference is eliminated. The measurement and comparison of these draw-off distances and/or the corresponding changing of the loop size can be performed both continuously and at certain intervals of time, the changing of the loop size being expediently slowed in such a manner that a visible change in the goods is avoided.

An apparatus serves for the practice of this method, in which the goods draw-offs that are to be compared are capable of being operated independently of one another but with the same force, and a measuring potentiometer is associated with each of these draw-offs, this potentiometer being wired with a comparison potentiometer and being connected through a comparison circuit that is known in the art to an adjusting device that varies the loop size being produced. With each potentiometer there is associated a controllable restoring means that brings the potentiometers back to the starting position. A reduction gearing is associated with the measuring potentiometer for the achievement of good resolving power. Instead of the potentiometer, it may also be advantageous to provide contactors whose impulses are compared through a known digital system and are used to vary the loop size. An epicyclic gear train can be associated with each individual draw-off instead of the measuring potentiometer, these gear trains being connected together through a shaft driven by the prescribed draw-off distance and the excursion of their arms operating in each case a momentary contact switch, which is coupled to an adjusting system, which is known in itself, and which varies the size of the loop being produced. In this case the draw-off distance is signalled by a measuring wheel engaging into the goods or by the draw-off rolls as an angle of rotation.

In order to prevent backward movements of the measuring potentiometer, a slipping clutch can be provided, which will drive only in the direction of the measuring potentiometer. A servomotor or a ratchet-and-pawl drive can operate the adjusting means, which is known in itself, in order to vary the loop size being produced.

Further details of the invention can be seen in the drawings listed hereinafter.

The process of the invention is based on having each piece of goods that is to be compared made up at any knitting head in a flat knitting machine or on a hosiery machine and drawn off independently of the other pieces but with the same force. Each piece is thus subject to the same draw-off conditions and covers a certain distance in being drawn off, which is measured and compared with a prescribed draw-off distance. If at each working station the conditions are the same as regards thread tension and as regards the loop size determined by the sinking depth, there will be no difference in the pieces. This ideal state, however, prevails only in the rarest circumstances so that even during production differences occur in the measured draw-off distances of the individual pieces. These differences, which are determined continuously or at certain intervals of time, are utilized for the purpose of varying the loop size to be formed at the working station while production is in progress. The standard of comparison, which is the prescribed draw-off distance, can be, for example, the draw-off distance measured at one master knitting head or master machine, or the average of all measured draw-off distances, or else, the draw-off distance recorded on a program carrier such as a control tape or programming strip. Also, it makes no difference, as far as the invention is concerned, whether the comparison is performed electrically, mechanically (e.g., by superposition of rotary speeds) or otherwise.

In order that the draw-off distance may be varied in true proportion to the worked length of the goods, the performance of the process essentially requires a precisely definable draw-off that is independent for each piece being measured, a measuring apparatus that reflects the draw-off distance and compares it with the other draw-off distances to be measured, and an adjusting system which adjusts the loop size of the corresponding font or machine on the basis of the results of the measurement, thus adjusting the prescribed draw-off distance.

The process according to the invention is first described with reference to a flat knitting machine of known construction, the drawings showing substantially only those parts which differ from normal construction.

Figure 1:
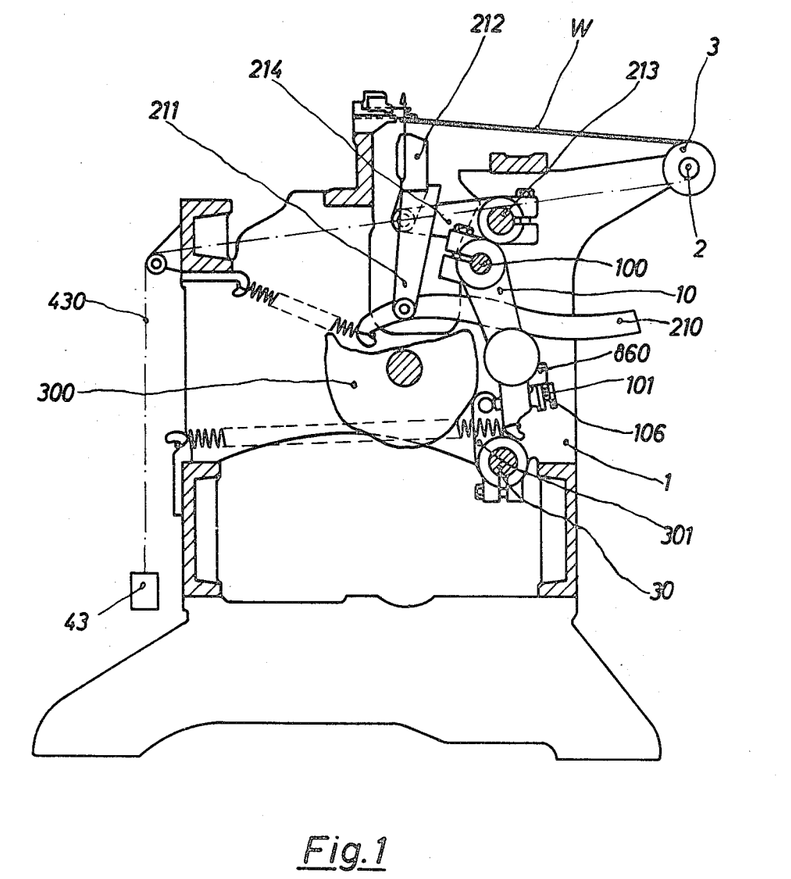
FIG. 1 shows a cross section of a flat knitting machine with the apparatus according to the invention.
Figure 2:
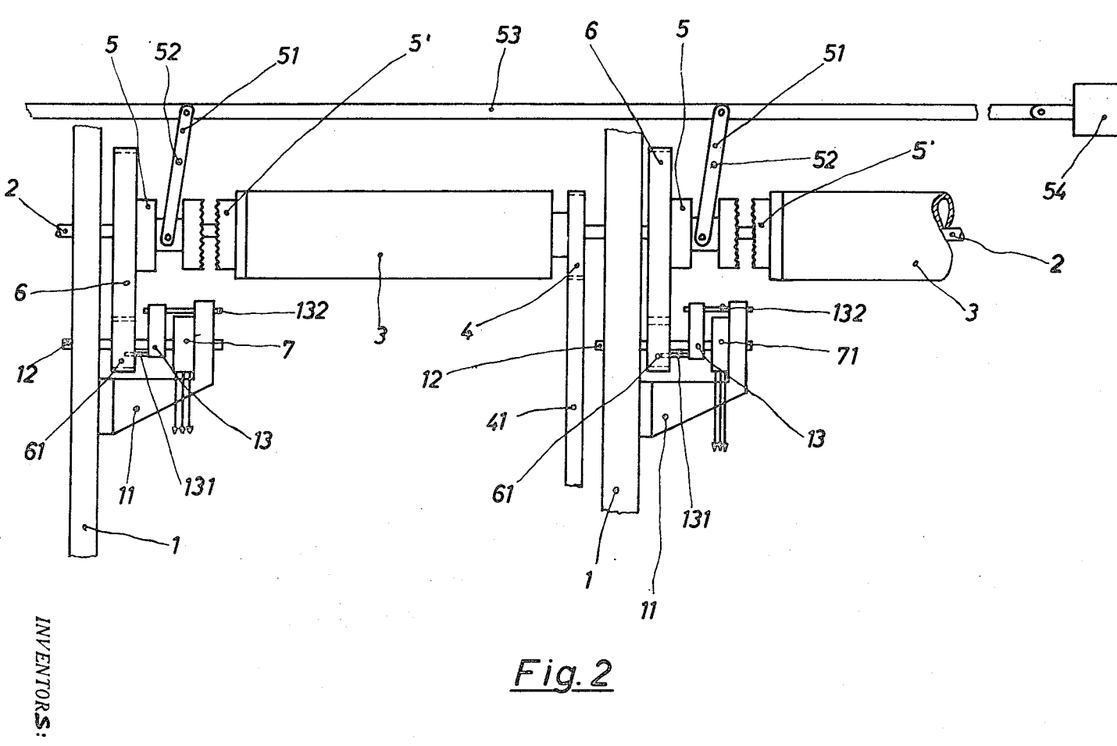
FIG. 2 shows the goods draw-off system on a flat knitting machine at a number of knitting heads in a diagrammatic representation.

Referring to FIGS. 1 and 2, the goods draw-off system consists of draw-off pulleys or rolls 3, which are disposed in the customary manner between frame walls 1 on the draw-off shaft 2. Since the draw-off in each knitting head must be indpendently operable but must be driven all by equal force, the draw-off rolls 3 are loosely rotatable on draw-off shaft 2 and are driven individually for each knitting head. In the simple form, this is done by means of cables 430 loaded by weights 43 and fastened to the periphery of each draw-off roll 3 (Imperial German Pat. 531,741, German Pat. 1,023,848, French Pat. 1,103,568, and German Pat. 1,098,147).

The driving, however, can also be performed by means, for example, of a certain type of known ratchet drive, one such drive being provided for each draw-off roll 3, and the amount of each step being adapted to the goods draw-off breadth by means of a controllable wedge bar (German Pat. 1,023,848, French Pat. 1,103,568).

Instead of being driven by one ratchet drive for each knitting head, the draw-off rolls 3 can be loosely rotatable on draw-off shaft 2 and be driven each by means of an overdrive, e.g., chain 41 (FIG. 2) and a sprocket 4, from a common drive shaft, a clutch, such as an induction clutch, or a cone or frictional-wheel drive, being provided for each knitting head for the transmission of a certain torque, which can be regulated according to the width of the goods. Such clutches are sufficiently known and have also been described in connection with flat knitting machines (Imperial German Pat. 624,714) so that it is not necessary to discuss these apparatuses in detail at this point.

If the diameter permits it, a clutch of this kind can also be housed directly inside of each draw-off roll 3 and the driving can be done in the customary manner through the draw-off shaft 2.

However, a controllable hydraulic motor or a rotating field motor according to German Pat. 1,024,665 (Swiss Pat. 327,238) and German Pat. 1,076,311 (British Pat. 859,442), respectively, can also be used.

Figure 3:
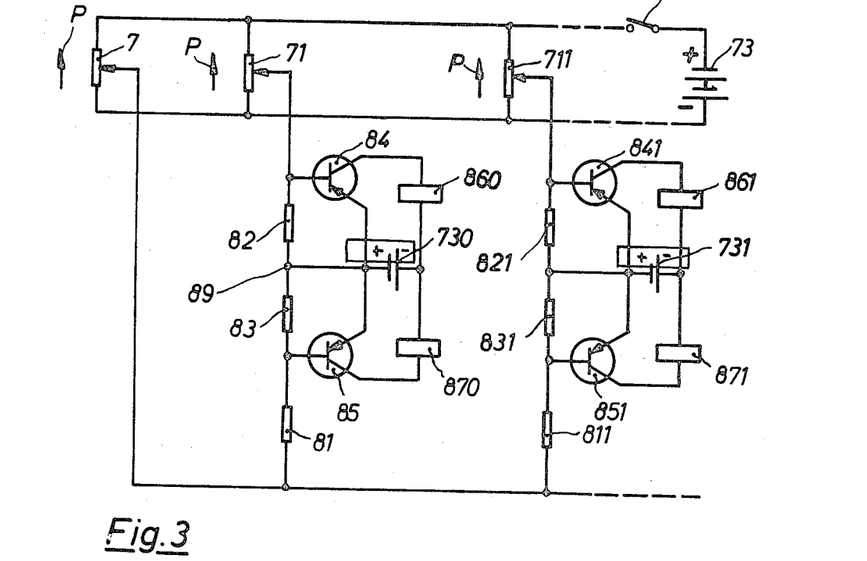
FIG. 3 shows the circuit diagram of the goods length regulating apparatus according to the invention using electrical length comparison.
Figure 7:
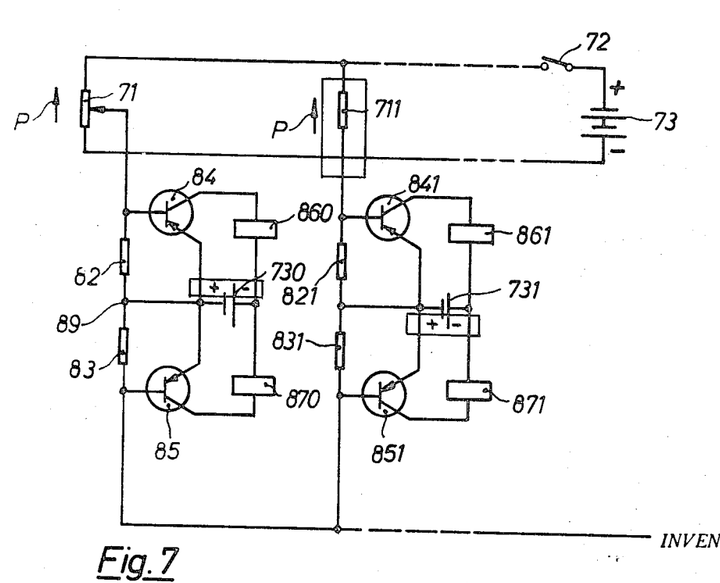
FIGS. 7 to 9 show further variations of the goods length regulating apparatus of FIG. 3.

Referring to FIGS. 3 and 7, potentiometers 7, 71, 711, and others not shown, are controlled by the draw-off rolls 3; they are connected in parallel in a direct-current circuit which is supplied by the power source 73 and can be interrupted by a switch 72. The resistances 81, 811 etc., measuring resistances 82–83, 821–831, etc., and potentiometers 71, 711 etc. of the knitting head to be controlled by the master knitting head are connected to the end terminals of potentiometer 7 of the master knitting head. The measuring resistances 82–83, 821–831, and others not shown are located in each case in the control circuits supplied by power sources 730, 731, and others not shown, in which the control current is amplified by amplifiers 84, 841 etc. (not shown) and 85, 851 etc. (not shown), respectively, for the operation of the stepping solenoids 860, 861 etc. (not shown) and 870, 871 etc. (not shown).

The regulating system that is known in the art (e.g., according to German Petty Pat. 1,861,107, British Pat. 1,018,425 and French Pat. 1,361,773) serves as the adjusting system. Since, however, the loop length must be able to be adjusted individually in each separate knitting head, such a regulating system must be provided for each single knitting head and be able to operate independently of the others.

By way of example, each working knitting head is provided with its own partial press shaft 100 (FIG. 1), on which the press roll lever 10 is secured. By means of the regulating screw 101, which by means of hand wheel 106 (FIGS. 4 and 5) can be brought into any desired basic position, the spacing between press roll lever 10 and the regulating lever 301 fastened on regulating shaft 30 is adjusted in the customary manner, thereby varying in a known manner the lifting of press roll lever 10 by cam 300 (FIG. 1). By means of the hand feeder 210 and the needle bar shear 211, the pressing movement produced by cam 300 and the press roll lever 10 is transmitted to the needle bar 212. The needle-bar lever 214 fastened on needle-bar shaft 213 moves needle bar 212 additionally in the vertical direction.

The adjusting system according to the invention has to be automatically adjustable, as it is not in the known regulating means.

Figures 4, 5, 6:
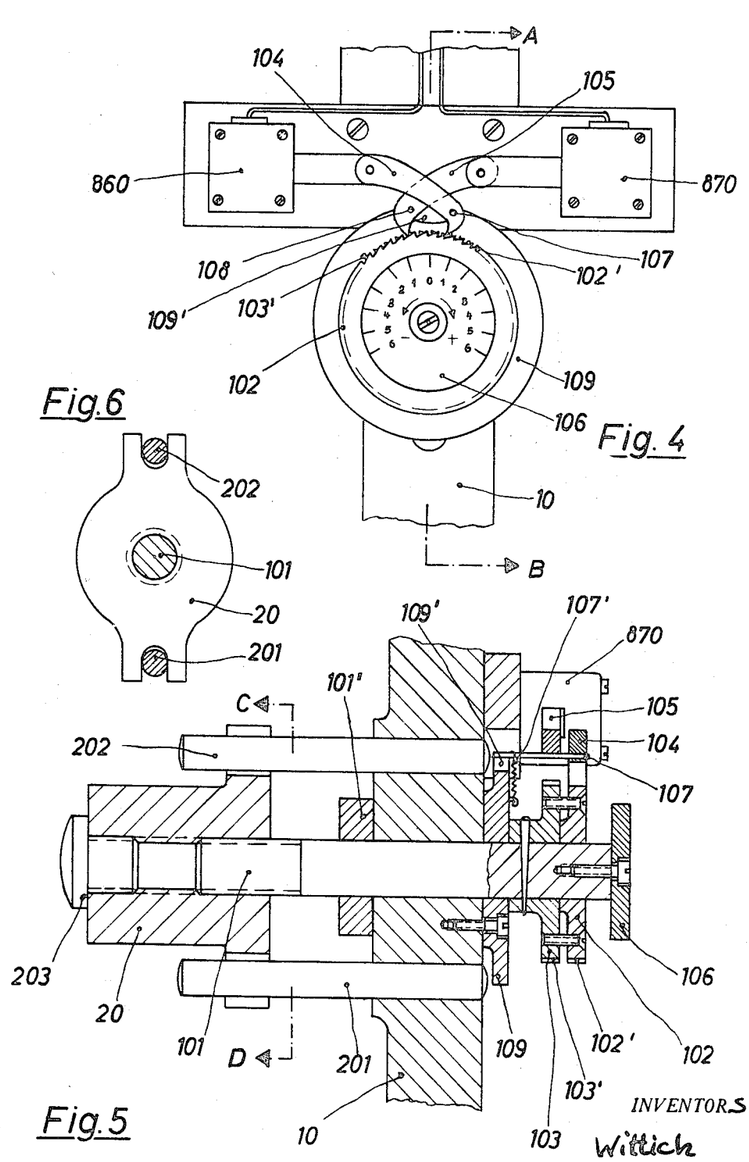
FIGS. 4 to 6 show the automatic adjusting system for the mesh size.

For this purpose, two ratchet wheels 102 and 103 for leftward and rightward stepping are fastened on the regulating screw 101, which is secured against axial displacement by a collar 101', these ratchet wheels being operated selectively by pawls 104 and 105, which are driven, in turn, by the two stepping solenoids 860 and 870, respectively, so that the regulating screw 101 will be rotated leftward or rightward (FIGS. 4 and 5). The amount of turning can be read on handwheel 106 which is provided with a scale.

To each of the pawls 104 and 105, a pin 107 and 108, respectively, is affixed, on which the pulling force of a tension spring 107' acts. This urges pin 107 and 108 against a cam 109 fastened to press roll lever 10 and keeps pawl 104 and 105, respectively, out of engagement with the teeth 102' and 103' of ratchet wheels 102 and 103, respectively, when the pawls are in the rest position. When one of the solenoids 860 or 870 is energized, the pin of the corresponding pawl slides into a recess 109' of cam 109 so that the pawl comes into engagement with the teeth of the corresponding ratchet wheel.

Threaded on the regulating screw 101, there is also a nut 20, which is secured against rotation by two pins 201 and 202 (FIG. 6), and which can be moved further in or out longitudinally by the rotation of the regulating screw 101. Nut 20 contacts the regulating lever 301 by means of a button 203.

The apparatus whose construction has been described above operates according to the analog process as follows:

All draw-off rolls 3 are driven with the same force, but separately; thus the distance covered by a point on the circumference of draw-off rolls 3, or their angle of rotation, and by the goods positively driven by the rolls, is equal if the stitch lengths of all knitting heads are also equal. This distance is transferred to the corresponding potentiometers 7, 71, 711 etc. The distance or angle of rotation covered by the potentiometers 7, 71, 711 etc. is consequently a measure of the length of the goods that have been knitted.

If, for example, potentiometers 7 and 71 are at the same angle of rotation, no voltage develops at the measuring resistances 82 and 83. If, however, potentiometer 71 lags behind 7 in the direction of arrow P, a positive voltage develops at measuring resistance 83 and a negative voltage develops at measuring resistance 82 with respect to junction 89. The voltage difference is amplified by the amplifier 84 and thus operates the stepping solenoid 860. Pin 107 of pawl 104 slides into the recess 109' of cam 109 and therefore engages teeth 102' of ratchet wheel 102, rotating regulating screw 101 leftward.

The scale on hand wheel 106 serves for the reading of the adjustment at any moment.

Nut 20 is moved outward by the rotation of regulating screw 101 to the left, thereby increasing the spacing between press roll lever 10 and regulating lever 301. In this manner, the pressing movement produced by cam 300 is transferred to a greater extent by press roll lever 10, hand feeder 210 and needle bar shear 211 to needle bar 212, and the loop-forming position of needle bar 212 is modified in such a manner that smaller loops are formed.

If potentiometer 71 runs ahead of potentiometer 7 in the direction of arrow P, a positive voltage develops at measuring resistance 82 and a negative voltage at measuring resistance 83 in respect to junction 89. In this case the current is simplified by amplifier 85 and stepping solenoid 870 is operated, which by means of pawl 105 and ratchet wheel 103 rotates regulating screw 101 to the right, thereby shifting nut 20 inward.

This reduces the spacing between press roll lever 10 and regulating lever 301 so that the pressing movement produced by cam 300, and hence the looping position, are so modified that larger stitches are formed.

Figure 10:
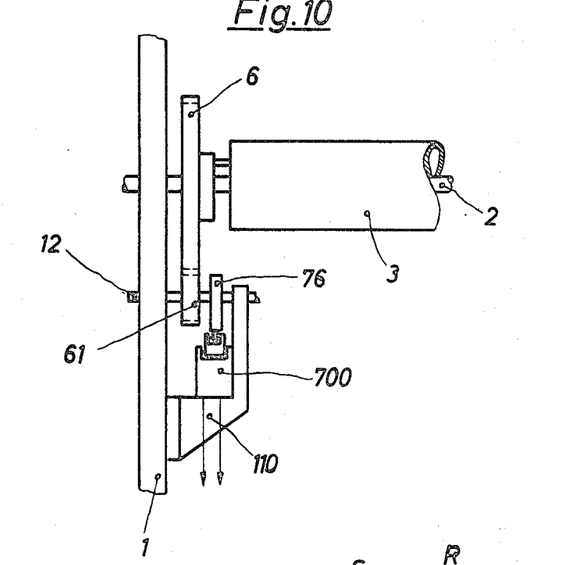
FIG. 10 shows an embodiment of the invention using contactors.

In order to achieve a good resolving power in the potentiometers, it is desirable to insert a gearing ahead of the measuring potentiometers (FIG. 2 and FIG. 10).

In that case a gear 6 is affixed to draw-off rolls 3 and drives a smaller gear 61. The latter and its respective potentiometer 7, 71, 711 etc. are mounted on a common shaft 12 borne by frame wall 1 and bracket 11.

Preferably the potentiometers are able to be set back from time to time to zero. In this embodiment, jaw 5' of a jaw clutch (FIG. 2) is secured on the draw-off shaft 2 in each font and is affixed to draw-off roll 3. The other jaw 5 of the jaw clutch is mounted loosely on draw-off shaft 2 and is affixed to the large gear 6 of the gear train, and it is guided by a clutch fork 51 loosely mounted on pivot pin 52. The clutch forks 51 are operated, for example, by a solenoid 54 and a connecting rod 53.

A spiral spring 13 is fastened at one end to a pin 131 carried by the small gear 61 and at the other end to a pin 132 carried by bracket 11.

At the end of a piece of goods, solenoid 54 is operated by the main control of the machine for as long as it takes to reset the potentiometers 7, 71, 711 etc. So the solenoid pulls connecting rod 53 to the right and pivots clutch forks 51, which thus shifts clutch jaws 5 leftward so that jaws 5–5' are disengaged. In long machines, in which the operation of connecting rod 53 requires a great effort, the solenoid can also pull the roller of a roller lever onto a cam which then shifts the connecting rod.

During the drawing off of the goods, the spiral springs 13, 13 are tensed through the draw-off rolls 3, the gear train 6, 61 etc. and the shafts 12 controlling potentiometers 7, 71 etc. When jaw clutch 5–5' is opened, the spiral springs 13 can unwind and thus, by means of shafts 12, restore the potentiometers to the starting position.

This process takes places so that any angular differences developing between the individual potentiometers 7, 71, 711 etc. during the knitting of a piece can be equalized in the pauses between two pieces of goods. During the knitting itself, clutch 5–5' is always in engagement.

To prevent reverse movements of the measuring potentiometers, clutch 5–5' can be in the form of a drag clutch that will transmit the draw-off motion only in one direction.

Instead of spiral spring 13, any other restoring element can be used, such as a small motor, for instance.

For the regulation of the goods length, the draw-off distance measured at the master knitting head can be used as the standard. It is also possible, however, to use the average of all measured draw-off lengths as the standard.

As shown in FIG. 7, the master knitting head is eliminated in this case, along with the resistances identified as 81 and 811 etc. in FIG. 3.

A draw-off distance recorded on a programming medium, such as a punch-card or a control tape, can also be used as the standard.

FIG. 10 shows another embodiment for the comparison of the draw-off distances. The gear 6 driven directly by the draw-off roll 3 drives through gear 61 and shaft 12 a cam which operates the momentary contact switches 700, 701, 702, etc. mounted on bracket 110.

Figure 11:
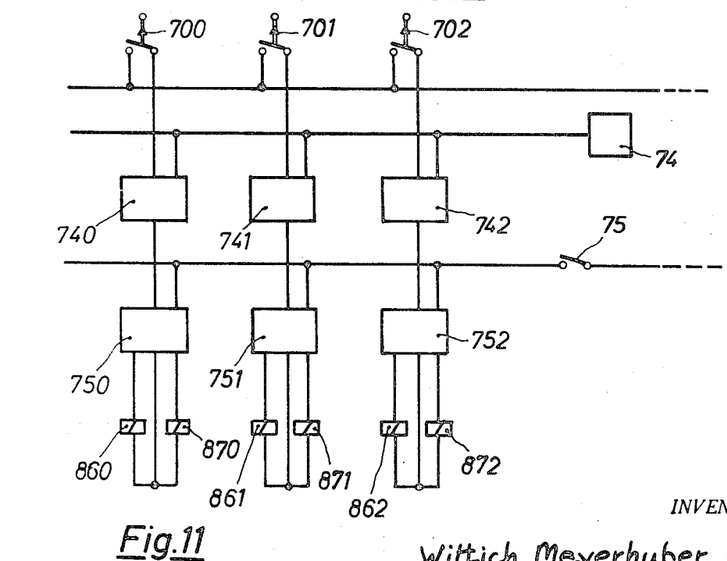
FIG. 11 is the circuit diagram of the apparatus of FIG. 10.

These momentary contact switches in turn control the first input of a difference counter 740, 741, 742, while the second input of this counter is controlled by a timer 74 (FIG. 11). Between each difference counter 740, 741 and 742, on the one hand, and the stepping solenoids 860–870, 861–871 and 862–872 etc., on the other, there is in each case an amplifier 750, 751 and 752 which is driven not only by the difference counter but also by a second input that can be interrupted by switch 75.

The apparatus in the design just described operates by the digital method as follows:

If timer 74 and momentary contact switches 700, 701, 702 etc. are operating synchronously, the difference counters 740, 741, 742 etc. produce no output signal. If, however, the counting impulses differ, the difference counter puts out a signal according to the phasing of the impulses. In this manner either the stepping solenoids 860, 861, 862 etc., or the stepping solenoids 870, 871, 872 etc., are excited through the amplifiers 750, 751, 752 etc., according to the phasing, so that the regulating screw 101 is adjusted by means of the corresponding pawl.

The adjustment of the regulating screw can also be performed by means of a motor. In that case, the stepping solenoids 860, 861, 862 etc and 870, 871, 872 etc. are replaced by control relays 880 and 881 which reverse the polarity of a three-phase motor 88′, thereby changing its direction of rotation or interrupting its power supply by the dropping out of the relays (FIG. 9).

Figure 9:
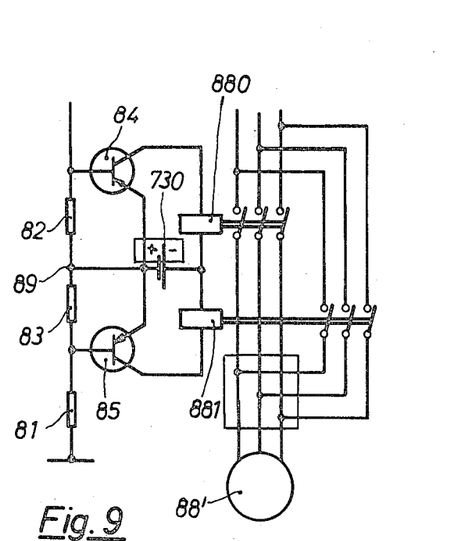

In the example shown in FIG. 9, neither stepping solenoids nor control relays are used and, instead, a DC motor 88 is provided in the control circuit.

The comparison of the draw-off distances can also be performed mechanically in a very simple manner by means of so-called epicyclic gear trains, just as advantageously as they can be compared electrically.

Figure 12:
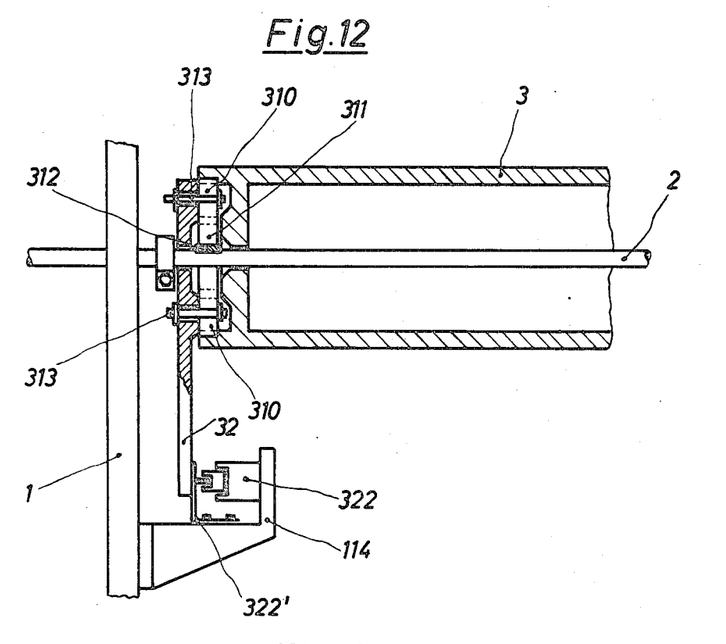
FIGS. 12 and 13 show the goods length regulating apparatus with mechanical comparison of length.

A system of this kind is shown in FIG. 12. The draw-off rolls 3, loosely mounted on shaft 2, are, as already described, driven with the same force but independently of one another.

The end opposite the drive end of draw-off roll 3 is in the form of an internal gear and drives the planet wheels 310, which are in engagement with the sun gear 311. The sun gear is made corotational with draw-off shaft 2 by means of a key 312. The two planet gears 310 are mounted on arm 32 by means of shaft pins 313. At the master knitting head, the arm 32, which of itself is rotatable about the draw-off shaft 2, is held fast by a support 33 indicated in broken lines in FIG. 13. At the other knitting heads the arm can pivot leftward or rightward, depending on the rotary speed ratio between draw-off roll 3 and draw-off shaft 2, thereby operating, by means of switch plates 321′ and 322′, the corresponding switches fastened to bracket 114 (e.g., switch 322, FIG. 12).

Figure 13:
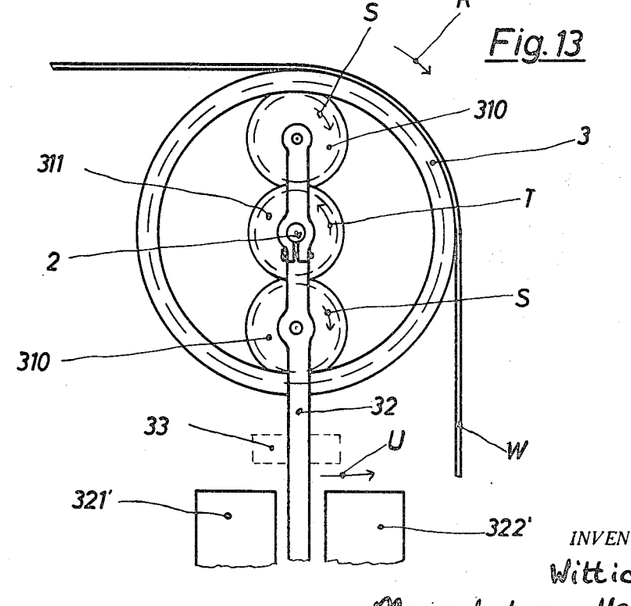

At the master knitting head, the goods W imparts to draw-off roll 3 a rotary movement in the direction of arrow R. In this manner the planet wheels 310 are rotated in the direction of the arrows S. Since arm 32 is held fast by support 33 and consequently cannot deviate from the vertical, the sun wheels 311, which positively drives the draw-off shaft 2, is rotated in the direction of the arrow T.

In the knitting heads that depend on the master knitting head, the draw-off shaft 2 imparts to sun wheel 311 a rotatory movement in the direction of the arrow T, while the goods W impart to draw-off roll 3 a rotary movement in the direction of arrow R. The planet wheels 310 rotate as before in the direction of arrows S. If, however, the speed of the draw-off roll 3 differs from that of the master knitting head, another speed ratio is produced between draw-off roll 3 and draw-off shaft 2, resulting in a deflection of arm 32.

If, for example, draw-off roll 3 lags behind the master knitting head, the planet wheels are also lagging, i.e. arm 32 undergoes a deflection rightward in the direction of arrow U. Through the elastic switch plate 322′ the switch 322 is operated, which closes the circuit for the stepping solenoids 870, 871, etc., so that the regulating screw 101 on press roll 10 is turned in the sense of enlarging the stitches.

In like manner, if the draw-off roll 3 runs ahead of the master knitting head, planet wheels 310 deflect arm 32 leftward so that arm 32 operates, through elastic switch plate 321′, the corresponding switches, which are not shown, controlling the stepping solenoids 860, 861, etc., so that the regulating screw 101 is turned in the sense of a diminution of the stitch size.

A measuring wheel engaging directly into the goods can also be used for measuring the draw-off distance of the goods, this wheel being disposed independently of the draw-off and transmitting the draw-off distance as an angle of rotation. This measuring wheel 34 (FIG. 15) has, for example, needles on its periphery, or card clothing 340, so that it receives a non-slip drive by the goods W. Measuring wheel 34 is mounted on a shaft pin 342 in a housing 341, which is disposed at a suitable place between the loop-forming parts and the draw-off apparatus.

Figure 15:
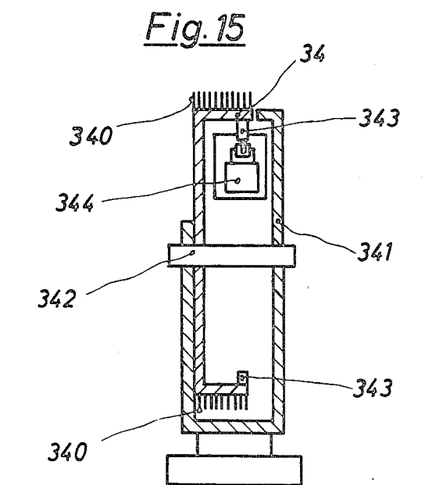
FIG. 15 shows the sensing apparatus according to the invention as a sealed component, in cross section.

Measuring wheel 34 has on its inside circumference one or more switch cams 343. These cams operate a switch 344 upon each rotation, thereby producing a corresponding number of impulses. The greater the number of cams, the closer is the sequence of impulses and the more accurate is the measurement of the draw-off distance.

The invention can be applied with advantage, not only to flat knitting machines, but also to flat-bed hosiery machines and to circular knitting and hosiery machines. Here again the problem is encountered that pieces of different length are produced on each machine or at each work station.

In order for the goods lengths at various working stations to be directly compared with one another, it is necessary that all working stations operate synchronously. In the knitting heads of a flat-bed knitting machine, this is inherent in their design. In other knitting and hosiery machines, however, in which only one piece is knitted at a time, this condition is met only if all machines have a common, rigidly coupled drive. This can entail the use of an electrical shaft instead of a mechanical one, if desired.

This can be accomplished, but for reasons of available space and the amount of down-time involved, it is not desirable. Therefore, it is advantageous to provide each machine with a standard of size.

In this manner, the work stations to be compared can produce identical goods lengths, and yet operate independently of one another. The best thing is for the standard of size derived from the master machine or station to be recorded on a program-recording means, which is fed to the other machine and causes the program to be carried out in accordance with the machine speed.

The use of the apparatus of the invention is described below with reference to a large circular knitting machine. According to FIG. 14, this machine is driven by a chain 94, through a sprocket 940, a clutch 941, a pair of bevel gears 942, a connecting shaft 943 and another pair of bevel gears 944.

Figure 14:
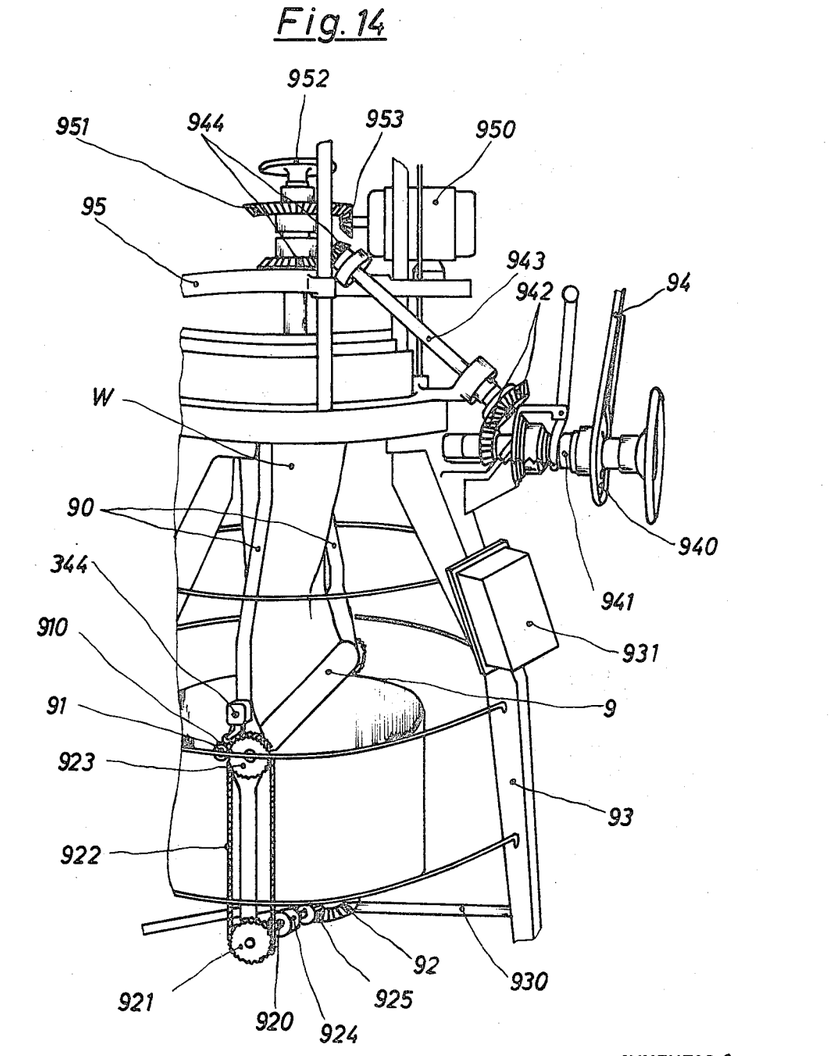
FIG. 14 shows a large circular knitting machine with the goods length regulating apparatus according to the invention in a perspective side view.

The members 90, which bear the draw-off rolls 9, are fastened to the machine in a known manner so that they rotate in accordance with the rotatory speed of the machine. The draw-off rolls 9 are driven by a horizontally disposed bevel gear 92, which is fastened non-rotationally on the cross-member 930 of the machine frame 93.

A bevel gear 925, mounted on shaft 920, rolls on bevel gear 92 so that one of the draw-off rolls 9 is driven through shaft 920, clutch 924, which transmits only a certain torque, sprocket 921, drive chain 922 and sprocket 923, the said draw-off roll 9, in turn, driving the counter-roll by friction. On the shaft 91 of this counter-roll, there is provided an excentric cam 910, which operates the momentary contact switch 344 once upon each rotation.

The momentary contact switch in this case corresponds to one of the momentary contact switches 700, 701, 702 etc. of FIG. 11. The additional units required for the electrical control of the regulating apparatus, such as timer 74, difference counters 740 and 741 etc., and amplifier 750 and 751 etc., are located in a housing 931 fastened to machine frame 93.

Figure 8:
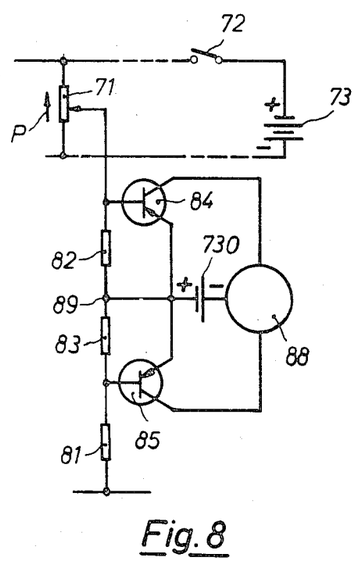

Above the dial disk, which is not illustrated, on cross-member 95, there is located the regulating wheel 952, which is rigidly affixed to a bevel gear 951. Bevel gear 951 meshes with the driving pinion 953 of a motor 950, which in turn is fastened upon a bracket 954 fastened to cross member 95. This motor can be connected like motor 88' in FIG. 8 or motor 88' in FIG. 9.

This motor 950 is controlled by the pulses emitted by momentary contact switch 344. If bevel gear 951 is rotated counterclockwise by the motor, the dial plate is raised, for example, so that larger stitches are knitted.

The measured pulses from each goods knitting head is compared, as already described, with the pulses from the master font.

Instead of electrical comparison, however, it is possible to achieve mechanical comparison by means of an epicyclic drive. In this case the measuring wheel 34 is simultaneously the internal gear of the epicyclic drive, and the shaft pin 342 is corotational with the sun gear. The shaft pins of the working stations which are to be compared must in turn be connected to one another, while the arm of the master knitting head is locked, as already described.

The method of the invention is also applicable to seamless hosiery knitting machines insofar as the draw-off distance of the goods can be sensed.

Figure 16:
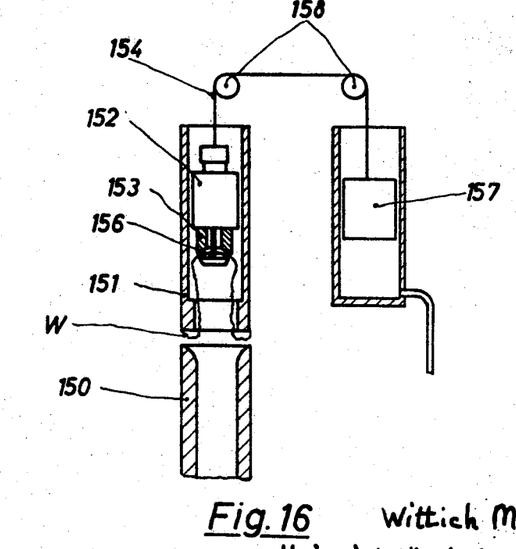
FIG. 16 is a side view of the arrangement of the measuring apparatus according to the invention on a seamless stocking circular knitting machine with a mechanical draw-off system.

An example of such an embodiment is shown in FIG. 16. Above the knitting cylinder 150 is the draw-off tube 151, which in the case of a double-cylinder machine is formed by the upper knitting cylinder. In this draw-off tube 151, a draw-off piston 152 is guided, which has at its bottom a hollow cone 153. The goods W is clamped between this hollow cone and a controllable clamping cone 156, and is pulled by weight 157 by means of a cable 154, which is warped around two pulleys 158.

One of the two pulleys 158 can be used for the measurement of the draw-off distance, the recording of the distance and its comparison with a prescribed standard being performed by one of the methods described above and the means corresponding thereto.

The adjustment of the loop size can be performed in fine hosiery circular knitting machines in two ways.

For example, the loop size can be varied by adjusting the cam 16 or by the raising or lowering of the knitting cylinder.

Figure 17:
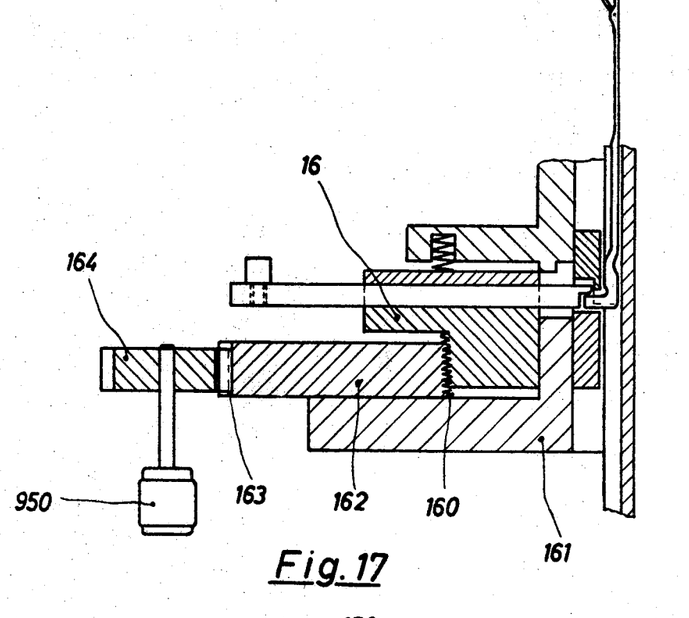
FIGS. 17 and 18 are a side view and perspective view, respectively, of adjusting devices which vary the loop size on circular knitting machines.

An example of the embodiment of the first method is shown in FIG. 17 (German Pat. 1,162,023, British Pat. 936,150, U.S. Pat. 3,116,620, French Pat. 1,263,147, Italian Pat. 633,129 Swiss Pat. 380,856). Cam 16 has on its circumference an external thread 160 and is concentrically mounted on the cam ring 161. The cam 16 can be adjusted upward or downward by means of an adjusting ring 162 engaging in its external thread. For this purpose the adjusting ring 162 is rotated by an adjusting motor 950 by means of an external gear 163 engaged by a pinion 164 so that all of the loop-forming parts disposed on cam 16 are influenced in the same manner.

Since in the case of hosiery it is practically only the section known as the "boot" or "leg" between the welt and the heel, whose length is important since the other parts of the stocking are relatively short in proporiton to the total length, it is often sufficient to vary only the adjustment for the legs. The regulating screw for this section of the goods is then adjusted by means of pawls or of a motor in the already described manner. In this manner the cylinder 150 is adjusted in height only during the knitting of this section of the goods.

Figure 18:
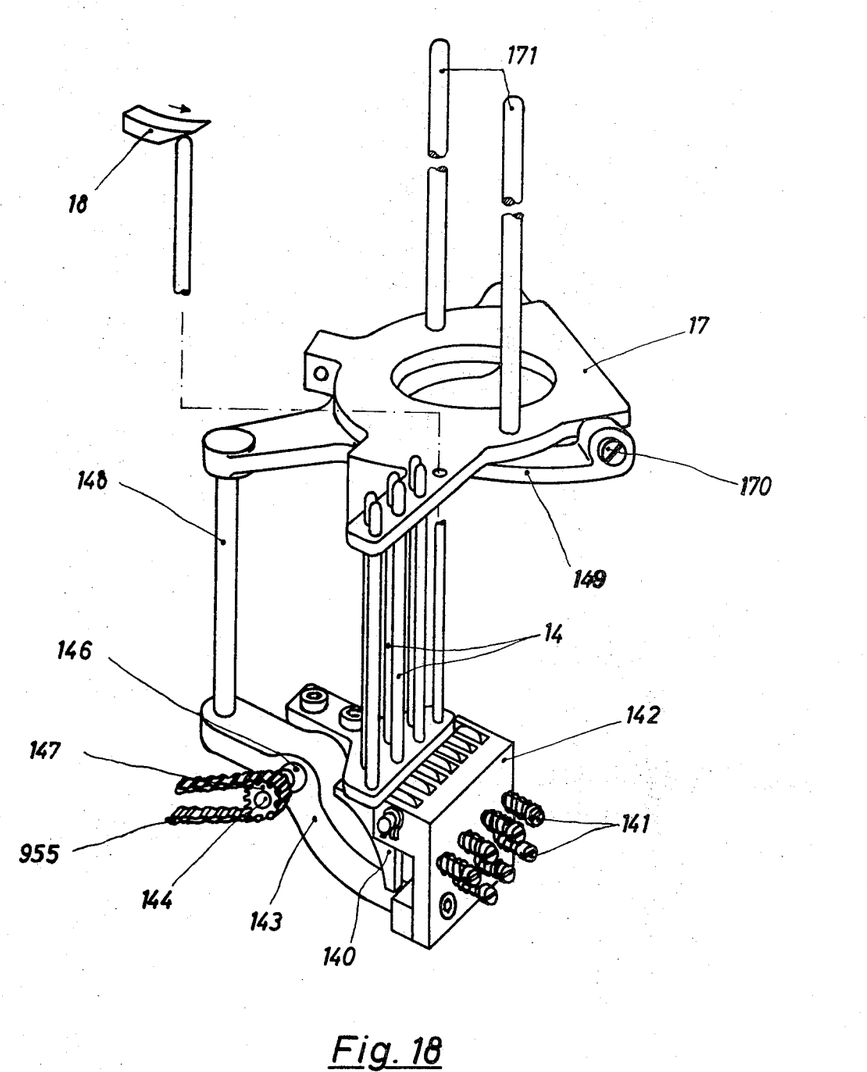

Another apparatus for the general adjustment of the loop size, in which the vertical position of the knitting cylinder 150 is varied in relation to the looping parts is shown in FIG. 18.

The tension adjustments are performed by wedges 18, by which the corresponding pins 14 are pushed downward against the bell cranks 140, which are previously adjusted for the desired tension by means of the regulating screws 141. The loop-adjusting plate 142 bearing the regulating screws 141 and the bell cranks 140 is fastened to loop adjusting lever 143. This loop adjusting lever is held by means of shaft 144 in a mount which is not shown. The shaft, on which an excentric sleeve 146 is co-rotationally disposed, bears on its one extremity a sprocket 147, which is adjusted by a motor 950 through a chain 955.

The movements of loop-adjusting lever 143 are transmitted through stepping pin 148 to the forked lever 149. This forked lever is held by the drum holder 17 fastened to the main stepping drum and pivots about point 170 in the stepping movements. In this manner the cylinder 150, which rests on the stepping rods 171, is raised or lowered in the customary manner.

What is claimed is:

1. In the process for manufacturing a plurality of knitted goods of equal length, the improvement which comprises drawing-off each piece of goods with an equal and independent force, measuring independently the draw-off distance of each of said plurality of goods drawn off over a length encompassing a multiplicity of individual loops, comparing each of said measured distances with a selected draw-off distance, producing electrical control impulses for those of said plurality of knitted goods which differ in length from said selected draw-off distance according to an increase or decrease of length and varying the loop size according to said difference in length in subsequent portions of said goods being knitted to bring the draw-off distance thereof into conformity with said selected distance.

2. Process according to claim 1, characterized in that said selected distance is the draw-off distance of one of said plurality of goods selected as a standard.

3. Process according to claim 1, characterized in that said selected distance is the average of the draw-off distances of said plurality of goods.

4. Process according to claim 1, characterized in that said selected distance is a distance recorded on a control tape used as a standard.

5. In a process for manufacturing a plurality of knitted goods of equal length, the improvement which comprises drawing-off each piece of goods with an equal and independent force, measuring independently the draw-off distance of each of said plurality of goods drawn off over a length encompassing a multiplicity of independent loops, transforming such draw-off distances into a corresponding number of electrical impulses, comparing each of said number of electrical impulses with a number of electrical impulses selected as a standard draw-off distance, producing electrical control impulses for those of said plurality of knitted goods which differ in the number of electrical impulses from said selected number of electrical impulses according to an increase or decrease of length and varying the loop size according to said difference in length in subsequent portions of said goods being knitted to bring the draw-off distance thereof into conformity with said selected standard draw-off distance.

6. Process according to claim 1, characterized in that the selected draw-off distance and the draw-off distances of said plurality of goods are translated into mechanical movement, and the mechanical movement of said selected distance is mechanically subtracted from the mechanical movement of said other distances and employing the remaining movement to varying the loop size.

7. Process according to claim 1, characterized in that the measuring and comparing of the draw-off distances is done continuously for sucessively small discrete draw-off distances to continuously vary the loop size.

8. Process according to claim 1, characterized in that the measuring and comparing of the draw-off distances takes place at preselected intervals of time.

9. Process according to claim 1, characterized in that varying the loop size is done gradually to avoid a visible change in the goods.

10. The combination with knitting apparatus having a plurality of knitting devices for knitting a plurality of goods, means to control and vary the loop size of each of said plurality of knitting devices and a plurality of draw-off devices to draw off each of said plurality of goods, of constant force drive means connected to and driving each of said draw-off devices, measuring instrumentalities connected to said draw-off devices to measure the draw-off distance thereof, a standard measuring mechanism, and a comparison device connected to each of said measuring instrumentalities and to said standard mechanism, said comparison device activating said means to control and vary the loop size when a measuring instrumentality varies from said standard mechanism.

11. In an apparatus for knitting a plurality of goods, a loop-size control adjusting mechanism, a plurality of draw-off devices, each of said draw-off devices arranged to draw off at least one of said plurality of goods, drive means driving each of said draw-off devices with the same draw-off force, measuring potentiometers associated with each of said draw-off devices, said measuring potentiometers being operatively associated with a standard potentiometer by a comparison circuit, said comparison circuit having means therein operative to engage and adjust said loop-size control adjusting mechanism.

12. Apparatus according to claim 11, characterized by drive means connected to said measuring potentiometers and operative when activated to restore them to their starting positions.

13. Apparatus according to claim 10, characterized in that said measuring instrumentalities and said standard mechanisms are impulse producers and said comparison device is a digital system.

14. Apparatus according to claim 10. characterized in that said measuring instrumentalities include an epicyclic gear train, and said comparison device includes an arm interconnecting the axis of the sun gear and at least one planetary gear of said epicyclic gear train, said arm upon movement being engageable with said loop-control means, said standard mechanism having an epicyclic gear train, a spacially fixed arm interconnecting the sun gear and at least one planetary gear of said standard mechanism and rotary means interconnecting the gear trains of said measuring instrumentalities and said standard mechanism so that an angular rotational variation therebetween moves the arm of said comparison device.

15. Apparatus according to claim 10, characterized in that said measuring instrumentalities include a measuring wheel engaging the goods.

16. Apparatus according to claim 10, characterized in that the measuring instrumentalities include the draw-off rolls.

17. Apparatus for knitting a plurality of goods and having a plurality of draw-off rolls, measuring devices operative when driven to measure the angular distances of said draw-off rolls, and a one-way drag clutch connecting said draw-off rolls, and said measuring devices so that said measuring devices may be clutchingly disengaged for resetting and may not be driven backward when said clutch is engaged.

18. Apparatus according to claim 10, characterized by an adjusting motor to drive said loop-controll means, said adjusting motor being activated by differences between said measuring instrumentalities and said standard mechanism.

19. Apparatus according to claim 10, characterized in that said loop-control means is driven by a ratchet and pawl mechanism, operated by a stepping solenoid responsive to differences between said measuring instrumentalities and said standard mechanism.

20. In an apparatus for knitting consecutively a plurality of goods: a draw-off device adjusting means to control and vary the loop size, measuring means connected to said draw-off device to measure the draw-off distance thereof over a length encompassing a multiplicity of individual loops, a computer standard measuring mechanism, and a comparison device connected to said measuring means as well as to said standard measuring mechanism, said comparison device activating said adjusting means to vary the loop size when said measuring means indicates a deviation from said computer standard measuring mechanism.

21. Apparatus according to claim 1, in which said apparatus includes a plurality of work stations with a corresponding number of draw-off devices to draw-off said knitted goods, a constant force drive means connected to and driving each of said draw-off devices, with a corresponding number of measuring means connected to said draw-off devices to measure the draw-off distance thereof, a computer standard measuring mechanism. and a comparison device connected to each of said measuring means and to said computer standard measuring mechanism, said comparison device activating said means to control and vary the loop size when a measuring means varies from said computer standard mechanism.

References Cited

UNITED STATES PATENTS

| 1,915,415 | 6/1933 | Gift | 66—82 |
| 2,220,807 | 11/1940 | Stout et al. | 66—82 |
| 2,655,801 | 10/1953 | Lynam | 66—149 |
| 2,963,887 | 12/1960 | Page et al. | 66—54 |
| 3,370,442 | 2/1968 | Tonkin | 66—55 |

FOREIGN PATENTS

| 1,377,029 | 9/1964 | France | 66—54 |
| 1,377,602 | 2/1967 | Germany | 66—55 |
| 852,855 | 11/1960 | Great Britain | 66—149 |
| 863,763 | 3/1961 | Great Britain. | |

RONALD FELDBAUM, Primary Examiner

U.S. Cl. X.R.

66—54, 55